United States Patent [19]
Schrick et al.

[11] Patent Number: 5,963,677
[45] Date of Patent: Oct. 5, 1999

[54] PULSE REPETITION INTERVAL CORRELATOR UTILIZING ZERO MEAN MATCHED FILTERING AND DIFFERENCE MINIMIZATION CORRELATION

[75] Inventors: Michael C. Schrick, McKinney, Tex.; Terry R. Altmayer, Dearborn, Mich.

[73] Assignee: Raytheon TI Systems, Inc., Lewisville, Tex.

[21] Appl. No.: 08/971,945

[22] Filed: Nov. 17, 1997

Related U.S. Application Data

[63] Continuation-in-part of application No. 08/328,639, Oct. 25, 1994, abandoned, and a continuation of application No. 08/890,893, Jul. 10, 1997.

[51] Int. Cl.$^6$ .................. G06K 15/316; G01S 13/08; G01S 13/00
[52] U.S. Cl. .................. 382/278; 342/137; 342/200; 342/189
[58] Field of Search .................. 382/276, 278; 375/200, 206, 207, 254, 340, 343, 350; 342/20, 89, 109, 132, 134, 137, 145, 160, 200, 203, 378, 465, 94, 147, 189; 364/600

[56] References Cited

U.S. PATENT DOCUMENTS

| | | | |
|---|---|---|---|
| 3,710,384 | 1/1973 | Aschcraft | 342/189 |
| 3,947,672 | 3/1976 | Harrison et al. | 342/378 |
| 4,053,884 | 10/1977 | Cantrell et al. | 342/189 |
| 4,622,552 | 11/1986 | Andrews et al. | 342/196 |
| 4,882,668 | 11/1989 | Schmid et al. | 364/600 |
| 5,265,121 | 11/1993 | Stewart | 375/343 |

*Primary Examiner*—David K. Moore
*Assistant Examiner*—Wenpeng Chen
*Attorney, Agent, or Firm*—Baker & Botts, L.L.P.

[57] ABSTRACT

A system to perform real time temporal correlation on pulsed and periodic signals. Application is to systems which perform PRI analysis of signals and provide signal gain as part of the correlation process. Correlation is performed in two stages, the first conditioning the signals for correlation using the zero mean, PW matched filter and the second performing temporal correlation using the difference minimization PRI correlator. The primary purpose of the filter is to minimize any DC signals before they reach the correlator. If DC signals reach the correlator, they correlate up at every PRI setting and on every temporal point, resulting in false detections and can block actual signals from detection. The filter also provides some gain for signals with pulse widths greater than one temporal cell. After conditioning with the filter, the data is correlated using a difference minimization correlator. The primary purpose of the correlator is to correlate signals of the selected PRI while rejecting signals which are not of the selected PRI. The correlator tracks pulses which are not aligned to temporal cell boundaries by a decision based upon the minimum difference between the normalized output, the current input and a time shifted input. By minimizing the difference, the noise is correlated with noise and the signal is correlated with signal. Pulse edges of the signal are maintained while maintaining the noise growth to a minimum.

20 Claims, 8 Drawing Sheets

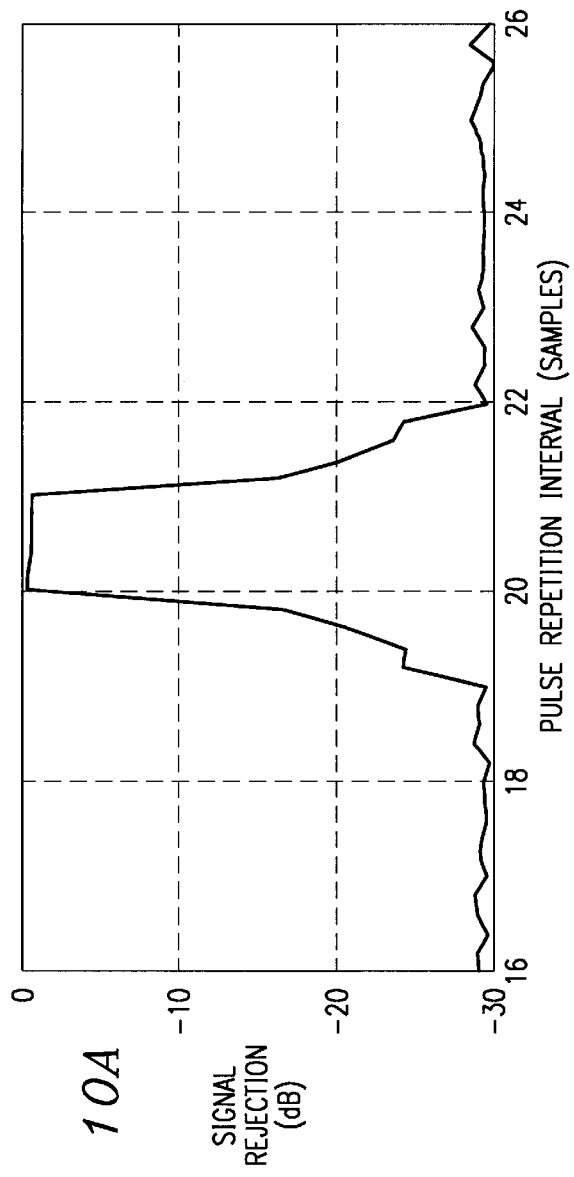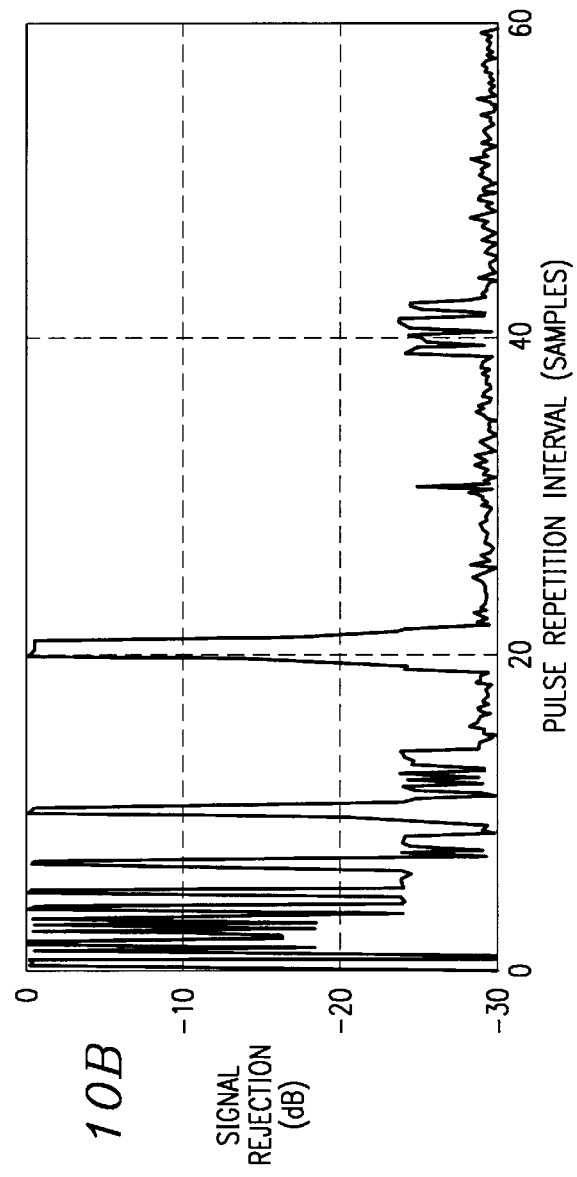
FIG. 10A
FIG. 10B 5,963,677

PULSE REPETITION INTERVAL CORRELATOR UTILIZING ZERO MEAN MATCHED FILTERING AND DIFFERENCE MINIMIZATION CORRELATION

This application is a continuation-in-part of U.S. Ser. No. 08/328,639 filed Oct. 25, 1994 (abandoned), and is a continuation of U.S. Ser. No. 08/890,893 filed Jul. 10, 1997.

TECHNICAL FIELD OF THE INVENTION

This invention relates to a real time Pulse Repetition Interval (PRI) correlator using zero mean, Pulse Width (PW) matched filtering and difference minimizing pulse repetition interval correlation.

BACKGROUND OF THE INVENTION

Currently, real time PRI correlation is accomplished by matching thresholded pulses together on a pulse by pulse basis. This type of correlation requires that the pulses already be thresholded and be at a Signal-to-Noise Ratio (SNR) sufficiently high such that the false alarm rate will be within the system requirement levels. Also, these prior art types of correlators do not provide any signal-to-noise ratio gain as part of their operation. The signal-to-noise ratio remains constant or deteriorates.

In the performance of spectral analysis of signals which are pulse modulated, it is desirable to determine characteristics related to the signals, these characteristics including PRI, PW, staggers and stagger positions. Other desirable features of a PRI correlator include ability to operate at low SNRs and ability to reject signals which are not matched to the selected correlator. It is therefore apparent that a system which is capable of collecting pulse information at lower than normal prior art signal-to-noise ratios is highly desirable.

SUMMARY OF THE INVENTION

In accordance with the present invention, there is provided a system which performs real time temporal correlation on signals which are pulsed and periodic in nature. In particular, the present invention applies to systems which perform PRI analysis of signals and provide signal gain as part of the correlation process. The correlation is performed in two stages. The first stage conditions the signals for correlation using the zero mean, PW matched filter and the second stage performs temporal correlation using the difference minimization PRI correlator.

The primary purpose of the zero mean matched filter is to remove or at least minimize any direct current (DC) signals before they can reach the correlator. If DC signals are allowed to reach the correlator, they correlate up at every PRI setting and on every temporal point. This results in false detections and could block actual signals from being detected. Another purpose served by the filter is to provide some gain for signals with pulse widths greater than one temporal cell.

After the data has been conditioned with the zero mean matched filter, it is correlated using the difference minimization correlator. The primary purpose of the minimum difference correlator is to correlate signals of the selected PRI while rejecting signals which are not of the selected PRI. The correlator is able to track pulses which are not aligned to temporal cell boundaries via a decision based upon the minimum difference between the normalized output, the current input and a time shifted input. By minimizing the difference, the noise is correlated with noise and the signal is correlated with signal. The techniques herein maintain the pulse edges of the signal while maintaining the noise growth to a minimum.

BRIEF DESCRIPTION OF THE DRAWINGS

FIG. 10(a) is a graph of PRI correlation rejection ration versus signal PRI for PRIs from 16 to 26 samples and FIG. 10(b) is such a graph for PRIs from DC to 60 samples.

DETAILED DESCRIPTION OF THE INVENTION

Figure 1:
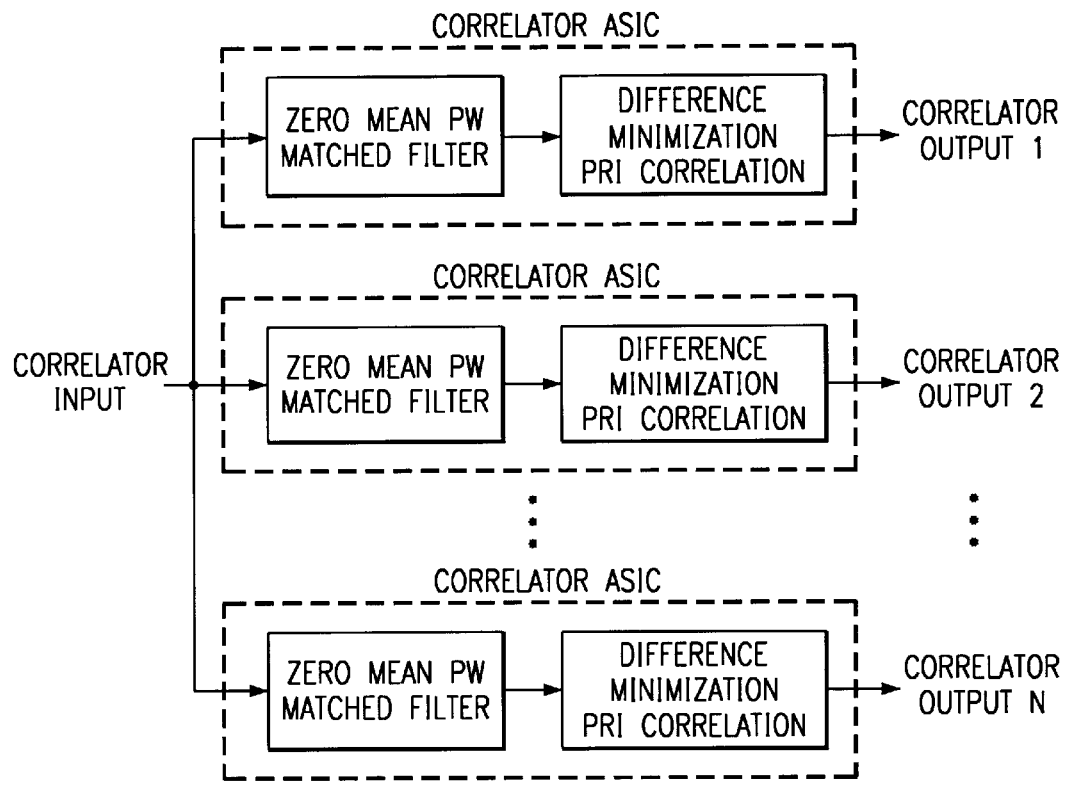
FIG. 1 is a block diagram of a multi-correlator system in accordance with the present invention.

Referring to FIG. 1, there is shown an application of the present invention embodied in a real time correlator application specific integrated circuit (ASIC). The ASICs are cascaded to provide detection over a range of pulse widths and PRIs with each of the correlator outputs 1, 2 . . . n being correlated to a different PRI.

The correlator inputs must be real or complex with stationary phase and the outputs will maintain the phase information for complex inputs. The data is not thresholded until the output of the correlator, it being assumed that the noise at the input of the correlator is Wide Sense Stationary (WSS), white and Gaussian.

Figure 2:
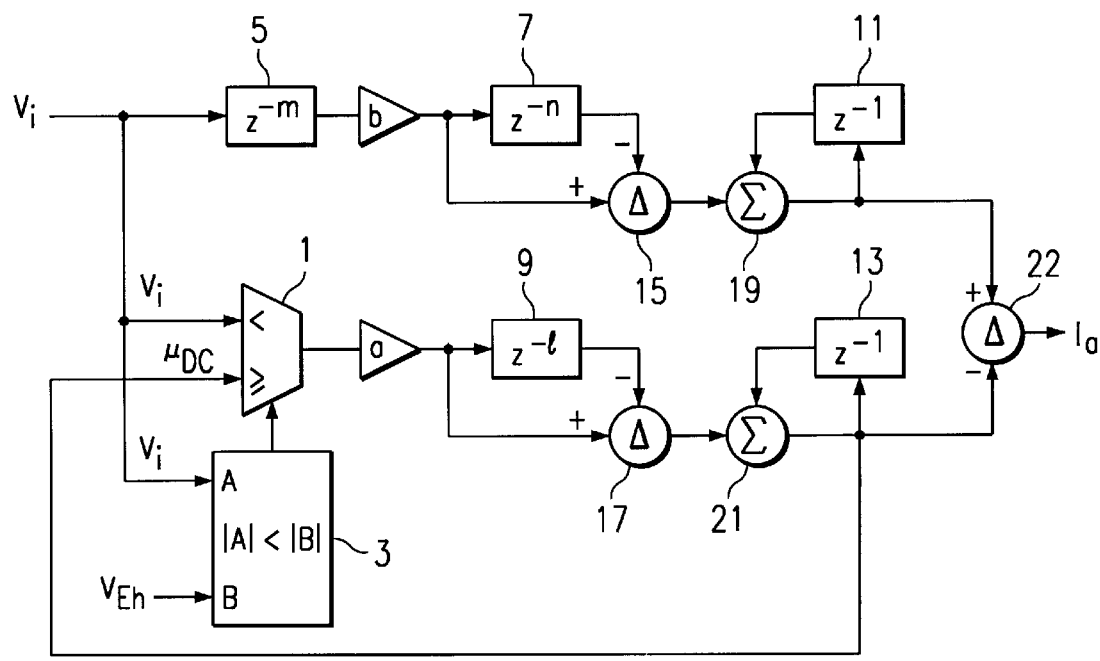
FIG. 2 is a block diagram of a zero mean, pulse width matched filter in accordance with the present invention.
Figure 8:
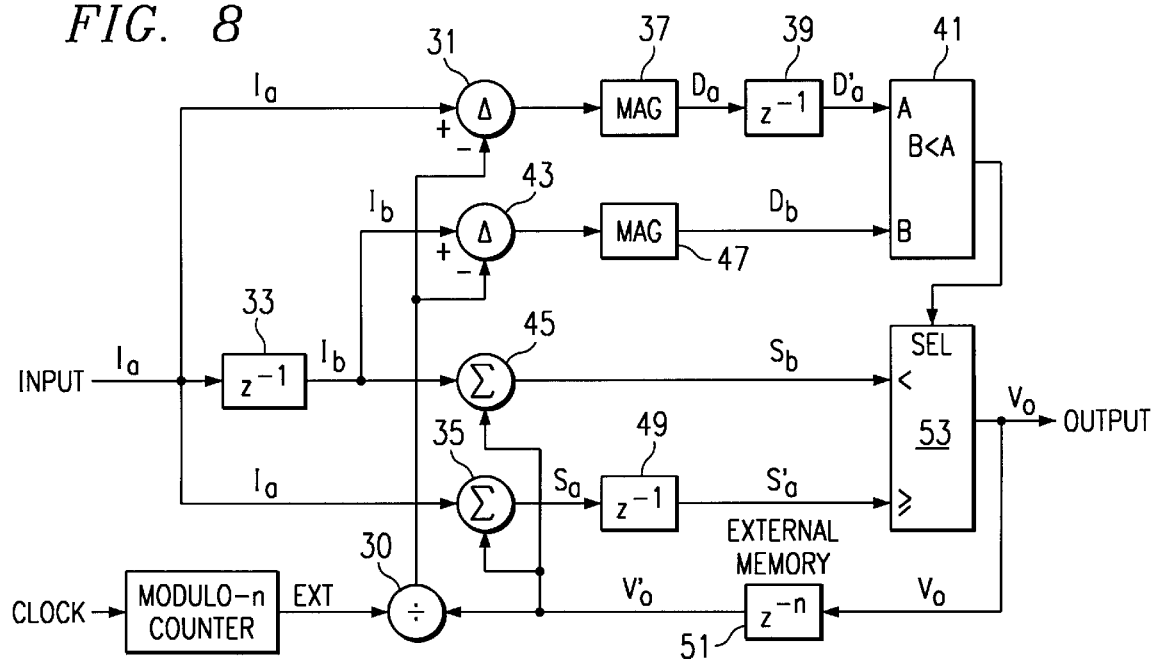
FIG. 8 is a block diagram of a difference minimization correlation circuit in accordance with the present invention.
Figure 5A:
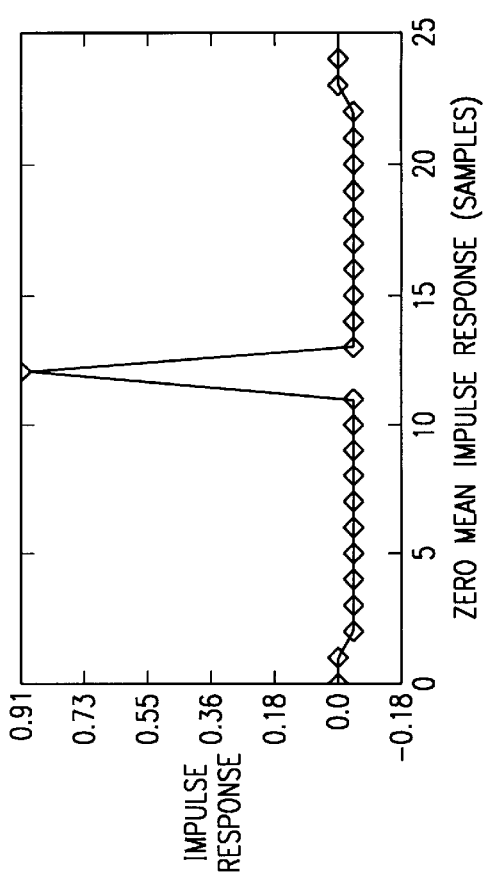
FIG. 5(a) is a graph of optimal impulse response, FIG. 5 (b) is a graph of zero mean impulse response, FIG. 5 (c) is a graph of frequency response
Figure 5B:
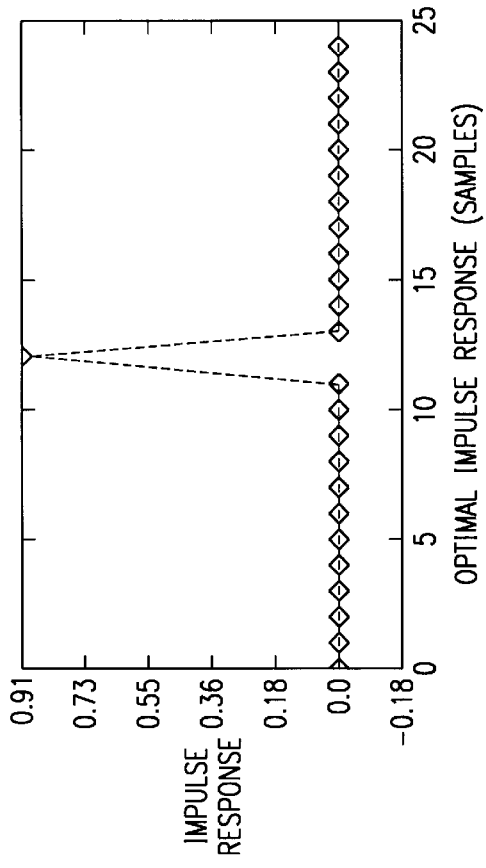
FIG. 5(d) is a graph of inverse normalized frequency of filter responses for $\tau_1=1$ and $\tau_2=10$.
Figure 5C:
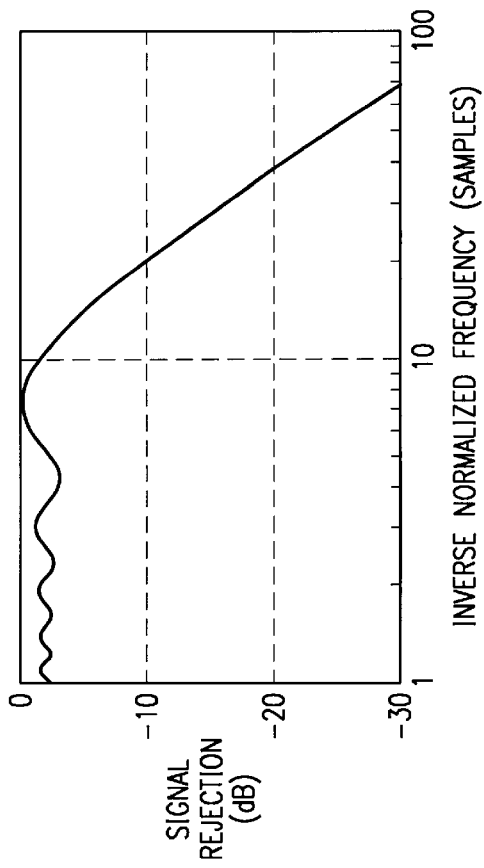
Figure 5D:
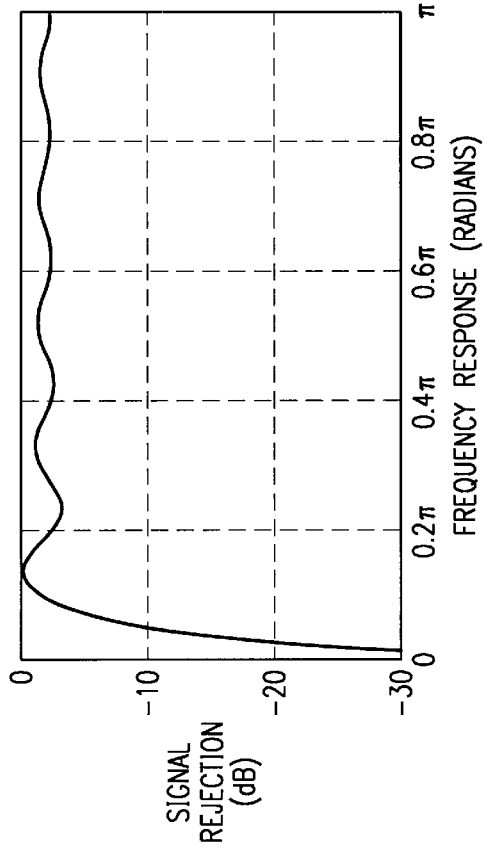
Figure 6A:
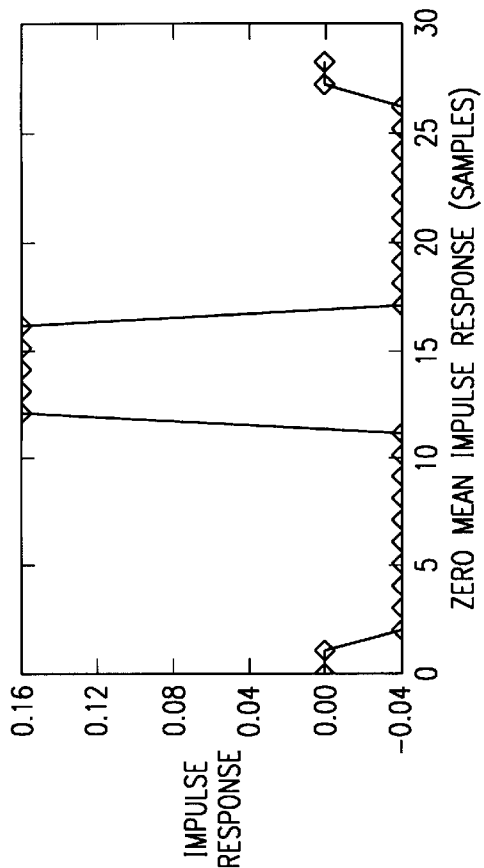
FIGS. 6 (a) to 6 (d) are graphs as in FIGS. 5 (a) to 5 (d) for $\tau_1=5$ and To=10.
Figure 6B:
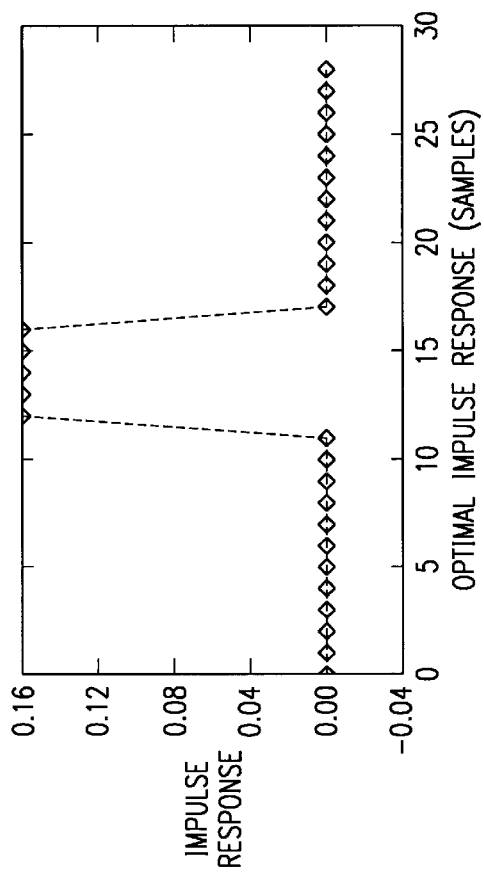
Figure 6C:
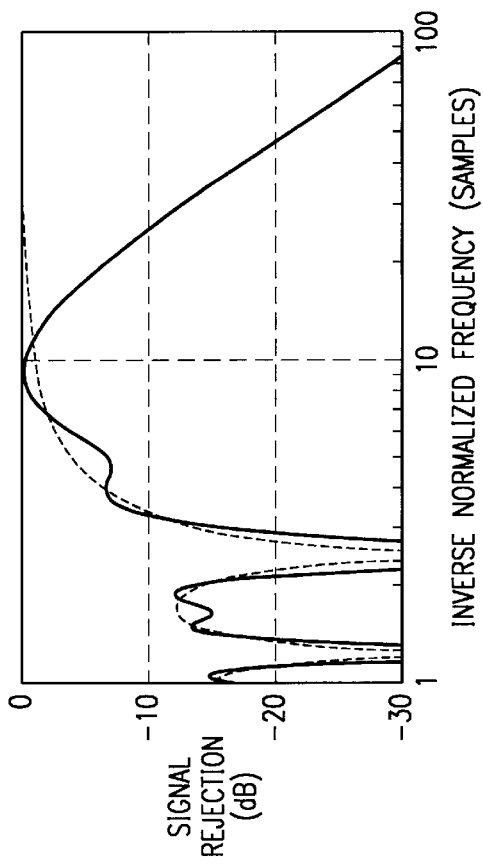
Figure 6D:
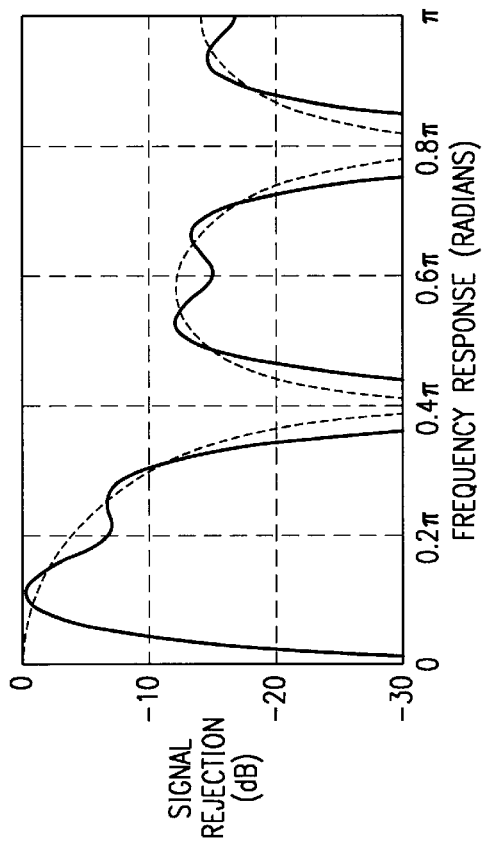
Figure 7A:
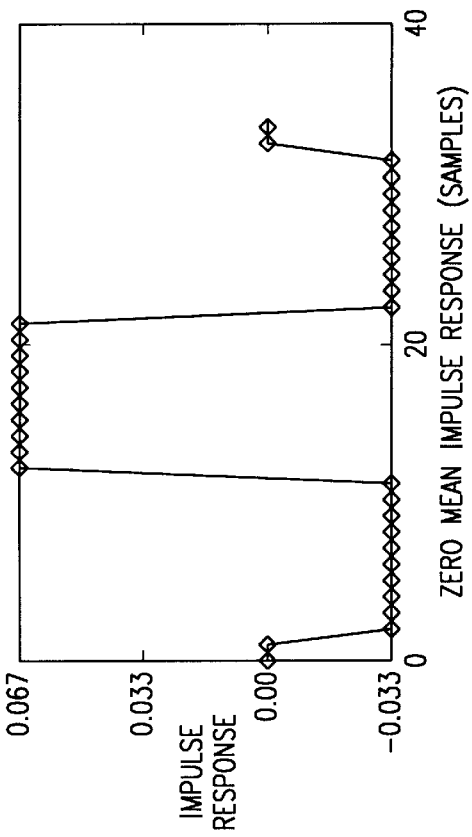
FIGS. 7(a) to 7(d) are graphs as in FIGS. 5(a) to 5(d) for=10 and To=10.
Figure 7B:
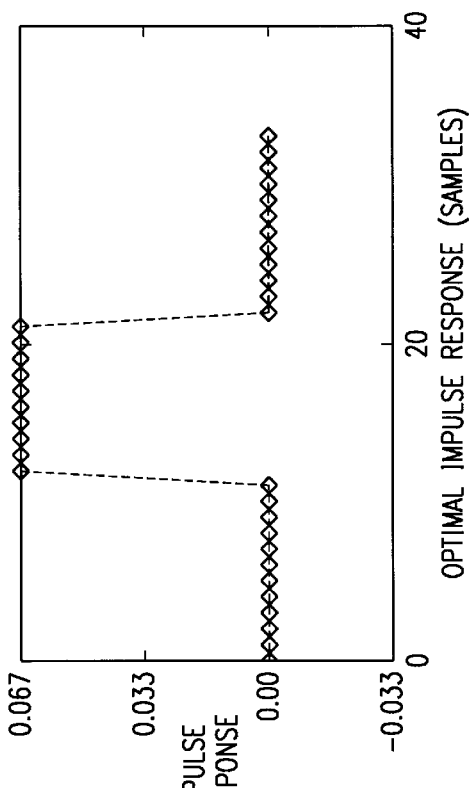
Figure 7C:
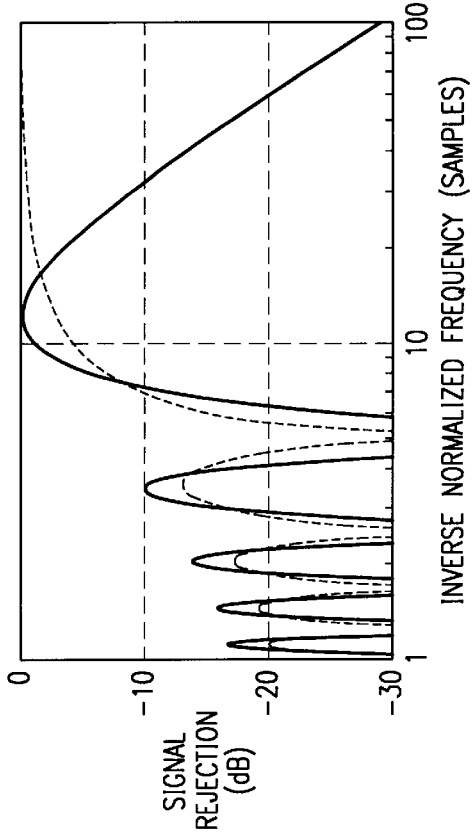
Figure 7D:
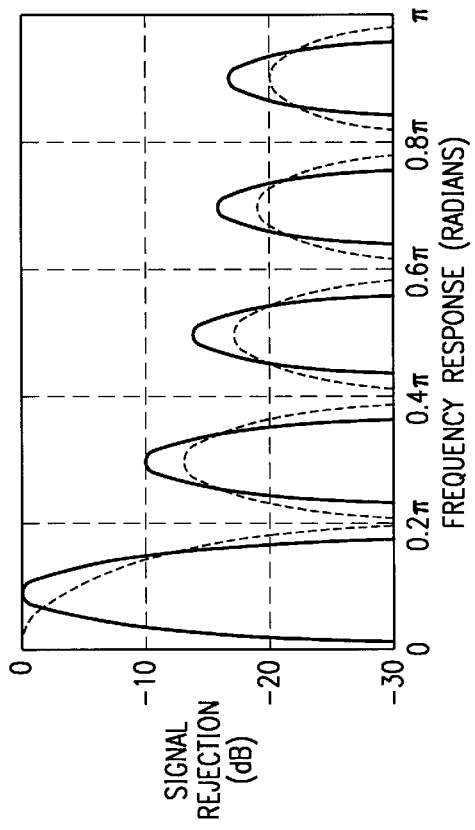

The multi-correlator system of FIG. 1 includes, in each path, a zero mean PW match filter in series with a difference minimization PRI correlation circuit to provide a correlator output for that path after operation of the correlator input. The correlator input can be applied to all of the paths simultaneously or one or more of the paths can be enabled (simultaneously or sequentially when more than one path is enabled) to provide correlation in response to particular PRIs. A path can be disabled by setting the values of the multipliers a and b to zero in FIG. 2. The circuitry of any one of the paths of FIG. 1 is determined by equations (1) to (5) set forth hereinbelow. A typical zero mean matched filter circuit of the type that can be used in the circuit of FIG. 1 is shown in FIG. 2 and a typical difference minimization PRI correlation circuit of the type that can be used in FIG. 1 is shown in FIG. 8.

In the multi-correlator system shown in FIG. 1, the correlator input is applied to all correlator ASICs simultaneously, each ASIC including a filter and difference minimization PRI correlation circuit. Each correlator ASIC can be tuned to a specific PW or PRI by programming the filter coefficients and delay line lengths on each ASIC.

Within each ASIC, the correlator input is first applied to the zero mean matched filter. The zero mean matched filter performs two functions, these being removal of the mean of the signal (ADC) and application of a matched PW filter to the incoming signals. DC signals must be removed prior to the difference minimization correlator because the correlator has its greatest response to DC signals. If DC signals are not removed, DC signals in the input data could cause false detections and could mask real signals from being detected.

Once the signals have been conditioned by the zero mean matched filter, they are applied to the difference minimization PRI correlator. This correlator applies a matched PRI filter to the incoming data and uses a difference minimization technique to align constantly the filter taps. This allows the filter to track signals which are aligned to cell boundaries.

The correlator outputs are then thresholded and the output data can be used to determine the signals which were present in the environment.

Referring to FIG. 2, there is shown a zero mean PW matched filter that can be used in the circuit of FIG. 1. The transfer function for this filter in this mode is given by the following equation:

$$H(z) = [bz^{-m}(1-z^{-n}) - a(l-z^{-l})]/(l-z^{-1}) \quad (1)$$

where:

z=the z transform, a $V_2$, b=$V_1-V_2$, l=$\tau_1+2\tau_2$, m=$\tau_2$, n=$\tau_1$.

The filter design of FIG. 2 implements the use of an integrator to extend the number of virtual FIR filter taps. This is accomplished by using the feed forward section of the filter to establish the transition points and the voltage levels of the filter. An integrator is then applied to the impulses to integrate the data into the desired impulse response.

The circuit of FIG. 2, in which all like elements are the same or equivalent, comprises the correlator input $V_i$ which is split into two paths. In the first path, the correlator input is delayed by FIFO delay line 5 having a delay m samples and then multiplied by a multiplier having a gain of "b", this signal then being applied to FIFO delay line 7 having a delay n samples and subtracted from the output of multiplier "b" by subtractor 15. Summer 19 adds the signal from summer 15 to the output of summer 19 after it has been delayed by FIFO delay line 11 having a delay of one sample.

In the second path, the correlator input,, is compared against the threshold voltage $V_{th}$. If the comparison from comparator 3 indicates a "less than" condition, then the correlator input ($V_i$) is selected by multiplexer 1. If the comparison from comparator 3 indicates a "greater than or equal to" condition, then the output of summer 21 ($\mu_{DC}$) is selected by multiplexer 1. The output of multiplexer 1 is then multiplied by a multiplier having a gain of all, this signal then being applied to FIFO delay line 9 having a delay of l samples and subtracted from the output of multiplier "a" by subtractor 17. Summer 21 adds the signal from summer 17 to the output of summer 21 after it has been delayed by FIFO delay line 13 which has a delay of 1 sample.

The output of summer 21 is then subtracted from the output of summer 19 by subtractor 22. The output of subtractor 22 is the output of the zero mean PW matched filter (Ia).

The values for a, b, l, m and n in the equations set forth hereinabove and hereinbelow as well as in the FIGURES are as follows:

$$a=V_2, b=V_1-V_2, l=\tau_1+2\tau_2, m=\tau_2, n=\tau_1 \quad (2)$$

Solving for the impulse response of the filter in the FIR mode, the variable substitutions listed in equation (2) hereinbelow are applied to equation (1) and the resulting transfer function in terms of $V_1$, $V_2$, $\tau_1$ and $\tau_2$ is set forth in equation (3). Terms are grouped in equation (4) and the time domain impulse response of the filter $h_x[n]$ is given by the equation (5) as follows:

$$H(z) = \frac{(V_1 - V_2)z^{-\tau_2}(1 - z^{-\tau_1}) + (V_2)(1 - z^{-\tau_2 - \tau_1 - \tau_2})}{1 - z^{-1}} \quad (3)$$

$$H(z) = \frac{V_2(1 - z^{-\tau_2})}{1 - z^{-1}} + \frac{V_1 z^{-\tau_2}(1 - z^{-\tau_1})}{1 - z^{-1}} + \frac{V_2 z^{-\tau_2 - \tau_1}(1 - z^{\tau_2})}{1 - z^{-1}} \quad (4)$$

$$h_x[n] = \begin{cases} V_2, 0 \le n \le \tau_2 - 1, V_1, \tau_2 \le n \le \tau_2 + \tau_1 - 1, V_2, \tau_2 + \tau_1 - 1 \\ 0, \text{otherwise} \end{cases} \quad (5)$$

Figure 3A:
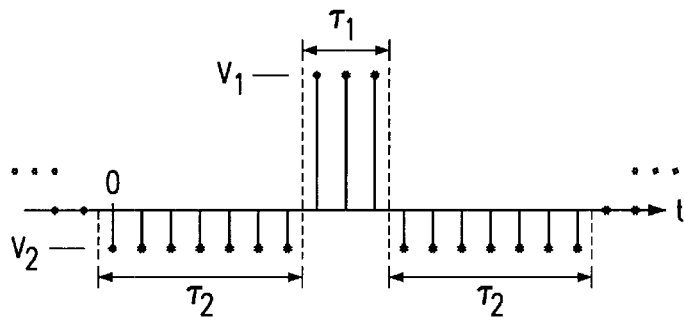
FIG. 3 (a) is a graph of waveform definition and FIG. 3(b) is a graph of filter coefficients for zero mean matched filter impulse responses.
Figure 3B:
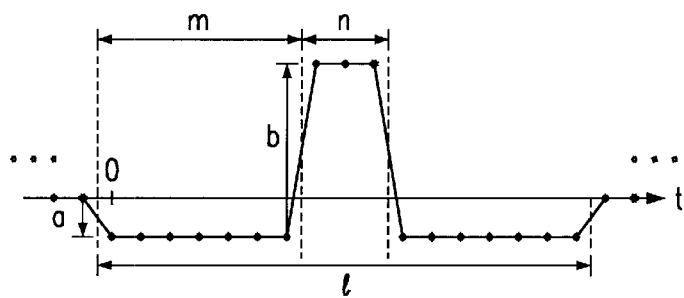

The impulse response of the zero mean matched filter in terms of equation (5) is shown in FIG. 3a. FIG. 3b shows the impulse response in terms of the filter coefficients defined in FIG. 2 and equation (1). In order to ensure that the filter has a zero mean, the area of the impulse response $V_1\tau_1$, $+2V_2\tau_2$ must be set to zero. The value of $V_2$ is used to match the value of $\mu_{DC}$ to the input level $V_i$ and is therefore determined by the equation $V_2=1/l=1/(2\tau_2+\tau_1)$. The value $V_i$ is used to set the mean of then filter to zero and is determined from the equation $V_1=-2V_2\tau_2/\tau_1$. The threshold voltage $V_{th}$ is used to set the maximum level of the signal mean $\mu_{DC}$. All examples set forth herein assume that this threshold voltage ($V_{th}$) is much greater than the input voltage $V_i$ (i.e. $V_{th}>>V_i$).

Figure 4A:
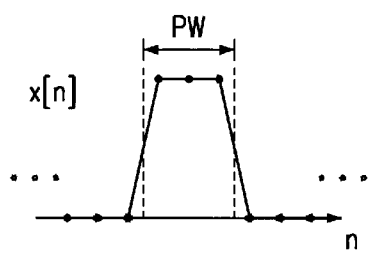
FIG. 4 (a) is a graph of signal input, FIG. 4 (b) is a graph of optimal matched filter.
FIG. 4(c) is a graph of zero mean matched filter.
FIG. 4(d) is a graph of normalized frequency response and FIG. 4 (e) is a graph of frequency response versus inverse frequency for optimal and zero mean filter responses for $\tau_1=3$ and $r=7$.
Figure 4B:
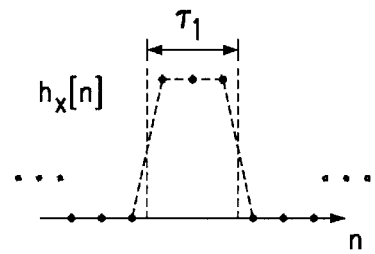
Figure 4C:
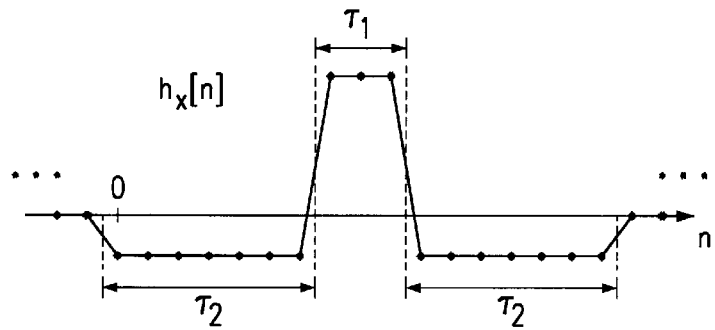
Figure 4D:
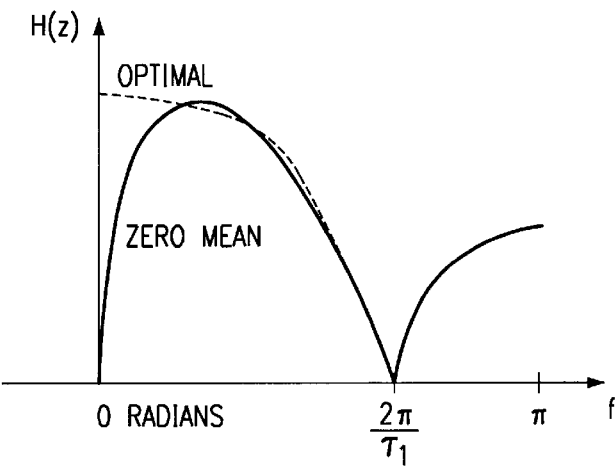

Assuming a pulsed real signal x[n] with $\tau_1=3$ as shown in FIG. 4a, the optimal filter for such a pulse is a filter whose impulse response $h_x[n]$ matches the signal x[n] which is depicted in FIG. 4b. The frequency response of this filter is obtained by taking the Discrete Fourier Transform (DFT) of the impulse response which is shown by the dashed line in FIG. 4d.

The problem with the optimal matched filter is that it has its greatest response at DC or 0 radians. The PRI correlator discussed hereinbelow also has its greatest response to DC signals, making it imperative that DC signals be removed before they are presented to the PRI correlator. To reject the DC signals, a suboptimal filter whose mean is zero is presented in FIG. 4c with $\tau_2=7$. As can be seen from the frequency response shown by the solid line in FIG. 4d, the filter completely rejects DC signals. The problem lies in choosing $\tau_1$ and $\tau_2$ such that signals of interest are passed while unwanted signals and noise are rejected.

Figure 4E:
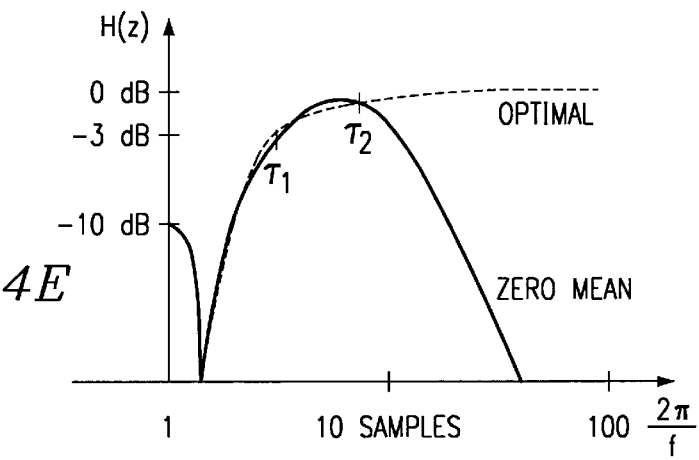

FIG. 4e shows the frequency responses for the optimal and zero mean filters with the x-axis normalized to units of 2n/f, where f is the frequency which corresponds to the frequency of the samples. The variables $\tau_1$ and $\tau_2$ have been indicated on the graph to illustrate how the frequency response is affected by the two variables. The parameter $\tau_1$ approximately sets the 3 dB low pass cut-off and the parameter $\tau_2$ approximately sets the deviation point from the optimal filter response.

| | $\tau_1$ | | | | | | | | | | |
|---|---|---|---|---|---|---|---|---|---|---|---|
| $\tau_2$ | 0.1 | 0.2 | 0.3 | 0.4 | 0.6 | 1.0 | 1.6 | 2.5 | 4 | 6.3 | 10 |

(a) SNR Response of Zero Mean Filter Normalized to Optimal Filter SNR Response (dB).

| | | | | | | | | | | | |
|---|---|---|---|---|---|---|---|---|---|---|---|
| 0.1 | −17.6 | −15.7 | −15.0 | −14.6 | −14.0 | −7.6 | −11.3 | −15.1 | 19.1 | −22.9 | −26.8 |
| 0.2 | −16.7 | −14.5 | −13.5 | −12.8 | −11.8 | −5.2 | −8.7 | −12.3 | −16.2 | −20.0 | −23.9 |
| 0.3 | −16.5 | −14.0 | −12.8 | −11.9 | −10.8 | −4.1 | −7.5 | −10.9 | −13.6 | −17.2 | −21.2 |
| 0.4 | −16.3 | −13.7 | −12.3 | −11.4 | −10.3 | −3.4 | −6.6 | −10.0 | −13.6 | −17.2 | −21.2 |
| 0.6 | −16.1 | −13.3 | −11.9 | −10.9 | −7.2 | −2.5 | −5.5 | −8.8 | −12.1 | −15.7 | −19.7 |
| 1.0 | −15.2 | −11.6 | −9.4 | −7.7 | −5.1 | −1.7 | −4.4 | −7.6 | −10.6 | −14.1 | −17.9 |
| 1.6 | −12.8 | −9.5 | −7.5 | −6.1 | −3.9 | −1.1 | −3.7 | −6.5 | −9.5 | −12.6 | −16.4 |
| 2.5 | −11.6 | −8.4 | −6.6 | −5.2 | −3.3 | −0.8 | −3.2 | −5.7 | −8.5 | −11.5 | −15.2 |
| 4.0 | −10.9 | −7.8 | −6.0 | −4.7 | −2.8 | −0.4 | −2.7 | −5.1 | −7.7 | −10.7 | −13.9 |
| 6.3 | −10.4 | −7.4 | −5.6 | −4.3 | −2.5 | −0.3 | −2.5 | −4.8 | −7.4 | −10.2 | −12.9 |
| 10.0 | −10.2 | −7.2 | −5.4 | −4.2 | −2.4 | −0.3 | −2.5 | −4.7 | −7.1 | −9.5 | −11.9 |

(b) SNR Response of Optimal Filter (dB).

| | | | | | | | | | | | |
|---|---|---|---|---|---|---|---|---|---|---|---|
| | −9.8 | −6.8 | −5.1 | −3.8 | −2.1 | 0.0 | −2.1 | −4.1 | −6.2 | −8.2 | −10.2 |

(c) SNR Response of Zero Mean Filter Normalized to response at $\tau_1 = 1$ (dB).

| | | | | | | | | | | | |
|---|---|---|---|---|---|---|---|---|---|---|---|
| 0.1 | −10.0 | −8.2 | −7.4 | −7.0 | −6.4 | 0.0 | −3.7 | −7.5 | −11.5 | −15.3 | −19.3 |
| 0.2 | −11.5 | −9.3 | −8.3 | −7.6 | −6.6 | 0.0 | −3.5 | −7.1 | −11.0 | −14.8 | −18.7 |
| 0.3 | −12.3 | −9.9 | −8.7 | −7.8 | −6.7 | 0.0 | −3.4 | −6.8 | −10.5 | −14.2 | −18.2 |
| 0.4 | −12.9 | −10.3 | −8.9 | −8.0 | −6.9 | 0.0 | −3.2 | −6.6 | −10.2 | −13.8 | −17.8 |
| 0.6 | −13.6 | −10.8 | −9.3 | −8.4 | −4.7 | 0.0 | −2.9 | −6.3 | −9.6 | −13.2 | −17.2 |
| 1.0 | −13.5 | −9.9 | −7.7 | −6.0 | −3.4 | 0.0 | −2.7 | −5.9 | −8.9 | −12.4 | −16.2 |
| 1.6 | −11.7 | −8.4 | −6.5 | −5.0 | −2.8 | 0.0 | −2.7 | −5.4 | −8.4 | −11.5 | −15.3 |
| 2.5 | −10.8 | −7.7 | −5.8 | −4.5 | −2.5 | 0.0 | −2.4 | −5.0 | −7.8 | −10.7 | −14.4 |
| 4.0 | −10.4 | −7.4 | −5.5 | −4.2 | −2.4 | 0.0 | −2.3 | −4.7 | −7.3 | −10.3 | −13.5 |
| 6.3 | −10.2 | −7.1 | −5.4 | −4.1 | −2.3 | 0.0 | −2.2 | −4.5 | −7.1 | −9.9 | −12.6 |
| 10.0 | −9.9 | −6.9 | −5.2 | −3.9 | −2.2 | 0.0 | −2.2 | −4.4 | −6.8 | −9.2 | −11.7 |

(d) SNR Response of Zero Mean Filter Normalized to response at $\tau_2 = 1$ (dB).

| | | | | | | | | | | | |
|---|---|---|---|---|---|---|---|---|---|---|---|
| 0.1 | −2.4 | −4.1 | −5.6 | −6.9 | −8.8 | −5.9 | −6.9 | −7.5 | −8.5 | −6.8 | −9.0 |
| 0.2 | −1.6 | −2.9 | −4.1 | −5.1 | −6.7 | −3.5 | −4.3 | −4.8 | −5.6 | −5.9 | −6.1 |
| 0.3 | −1.3 | −2.4 | −3.4 | −4.2 | −5.7 | −2.4 | −3.0 | −3.4 | −4.0 | −4.0 | −4.4 |
| 0.4 | −1.1 | −2.1 | −3.0 | −3.7 | −5.1 | −1.7 | −2.2 | −2.4 | −3.0 | −3.1 | −3.3 |
| 0.6 | −0.9 | −1.7 | −2.5 | −3.2 | −2.1 | 0.8 | −1.0 | −1.2 | −1.5 | −1.6 | −1.8 |
| 1.0 | 0.0 | 0.0 | 0.0 | 0.0 | 0.0 | 0.0 | 0.0 | 0.0 | 0.0 | 0.0 | 0.0 |
| 1.6 | 2.4 | 2.1 | 1.9 | 1.6 | 1.2 | 0.6 | 0.7 | 1.1 | 1.1 | 1.5 | 1.5 |
| 2.5 | 3.6 | 3.2 | 2.8 | 2.4 | 1.8 | 0.9 | 1.2 | 1.8 | 2.1 | 2.6 | 2.7 |
| 4.0 | 4.3 | 3.8 | 3.4 | 3.0 | 2.3 | 1.3 | 1.7 | 2.4 | 2.9 | 3.4 | 3.9 |
| 6.3 | 4.7 | 4.2 | 3.8 | 3.3 | 2.6 | 1.4 | 1.9 | 2.8 | 3.2 | 3.9 | 5.0 |
| 10.0 | 5.0 | 4.4 | 3.9 | 3.5 | 2.7 | 1.4 | 2.0 | 2.9 | 3.5 | 4.6 | 6.0 |

The Table shows how the SNR response to the filters is affected by variations in $\tau_1$, $\tau_2$ and the pulse width of the input signal. Through the Table, the input pulse width has been normalized to 1.0 and $\tau_1$, and $\tau_2$ are varied from 0.1 to 10. Table section (b) shows how pulse width mismatch affects the optimal filter design. Note from FIG. 4b that the value $\tau_2$ does not exist for the optimal filter. In Table section (a) the data has been normalized to the optimal filter design with $\tau_1$=1.0. Table sections (c) and (d) contain the same data as section (a) except that they have been normalized to $\tau_1$=1.0 and $\tau_2$=1.0 respectively. In Table sections (a), (c) and (d) the bolded data corresponds to the points where $\tau_1$=$\tau_2$.

From Table section (b) it can be seen that, as expected, the optimal SNR response occurs at the point where $\tau_1$=PW and the SNR drops off at 10 dB per decade. The SNR response of the zero mean matched filter is shown in Table section (a) and it can be seen that the optimal SNR response of this filter also occurs at $\tau_1$=PW for all values of $\tau_2$. It can also be seen that as $\tau_2$ approaches infinity, $V_2$ approaches zero and the impulse response of the zero mean filter approaches that of the optimal filter.

In order to determine values for $\tau_1$ and $\tau_2$, it is necessary to weight the SNR response against the ability of the filter to reject unwanted signals. Also, the larger the value of $\tau_1$, the more pulse width smearing will occur as a result of the linear convolution with the filter. Therefore, if it is desired to minimize pulse width smearing, there is concern only with rejection of DC signals from the correlator and $\tau_1$ would be chosen to equal 1 and $\tau_2$ would be as large as possible. The filter responses for such a system are shown in FIG. 5. In FIGS. 5 to 7, the shaded lines represent the optimal filter responses and the solid lines represent the zero mean filter responses. If pulse width smearing and SNR are not of as great concern as interference with signal rejection, the filter can be more highly tuned for a given pulse width. FIG. 6 shows the filter responses for $\tau_1$=5 and $\tau_2$=10 and FIG. 7 shows the filter responses for $\tau_1$ and $\tau_2$=10.

FIG. 8 is a block diagram of the difference minimization correlator. The input to the correlator is the output of the filter of FIG. 2 and the clock input is the signal which clocks each input into the correlator from the filter of FIG. 2. The clock inputs are counted by the modulo-n counter which increments every "n" samples counted therein. The value of "n" determines the PRI range of the correlator and should be set to the truncated value of the PRI to which the correlator is tuned. The output of the modulo-n counter is used to normalize the delayed output to the same levels as the input signals. This is required to determine the error or difference between the normalized delayed output and either the current input or a time shifted input. The correlator includes two correlation loops. The first correlation loop is represented by a $S_a$, $S_a{}'$, $V_o$, $V_o{}'$ and is of length n+1 and the second correlation loop is represented by $S_b$, $V_o$, $V_o{}'$ and is of length n. Therefore, the range of PRIs that can be covered by this correlator is from n to n+1.

The decision upon which correlator path is selected is based upon the difference or error between the normalized delayed output and either the current input ($I_a$) or a time shifted input ($I_b$). This is the only non-linearity in the system and, by minimizing the difference or error, signals are matched with similar signals and noise is matched with similar noise. With this design, the signal and noise both grow at very close to their theoretical rates. That is, the growth rate will be the square root of n ($n^{1/2}$) for noise and the growth rate will be n for the signal.

Another feature of the design is that the two paths, $I_a, S_a$, $S_a{}'$, $V_o$ and $I_a$, $I_b$, $S_b$, $V_o$, from input to output are symmetric in delay. This feature allows the correlator to track temporal drift of a PRI across cell boundaries without smearing the pulse width. This is very useful for detecting sub-harmonics and for estimating pulse width.

The input to the difference minimization correlation circuit ($I_a$) is fed to a difference circuit 31 ($I_a$), a one shift delay 33 and a summer 35. The divider circuit 30 divides the delayed output of delay line 51 by the output of the modulo-n counter or by 1, whichever is larger and applies it to the difference circuit 31. The difference circuit 31 subtracts the signal from divider circuit 30 from the input signal ($I_a$) and applies its difference signal to a magnitude estimator 37. The output of the estimator 37 ($D_a$) is delayed in a one shift delay 39 and fed to a comparator 41, this being referred to as the $D_a{}'$ signal.

The output of the one shift delay 33 (Ib)is applied to a difference circuit 43 and a summer 45, the divided output of the counter being subtracted from the delay signal ($I_b$) in the circuit 43 and applied to a magnitude estimator 47 the output of which is also applied to the comparator 41, this being referred to as the $D_b$ signal. The comparator 41 provides a positive output when the $D_b$ signal is less than the $D_a$ signal.

The output of the delay 33 is also summed in summer 45 with the output of the correlation circuit which has been delayed by n shifts in an n shift delay 51, the output of summer 45 being path B and being applied to a selector 53. The input is applied to a summer 35 along with the output of memory 51 to provide a sum signal which is delayed one shift by delay 49. The output of delay 49 is also applied to the selector circuit 53, this output being path A. The selector 53 provides a positive output when the signal at path A is greater than or equal to the signal at path B. The output of the selector is thresholded, this function not being shown herein and not being a part of this invention.

Figure 9A:
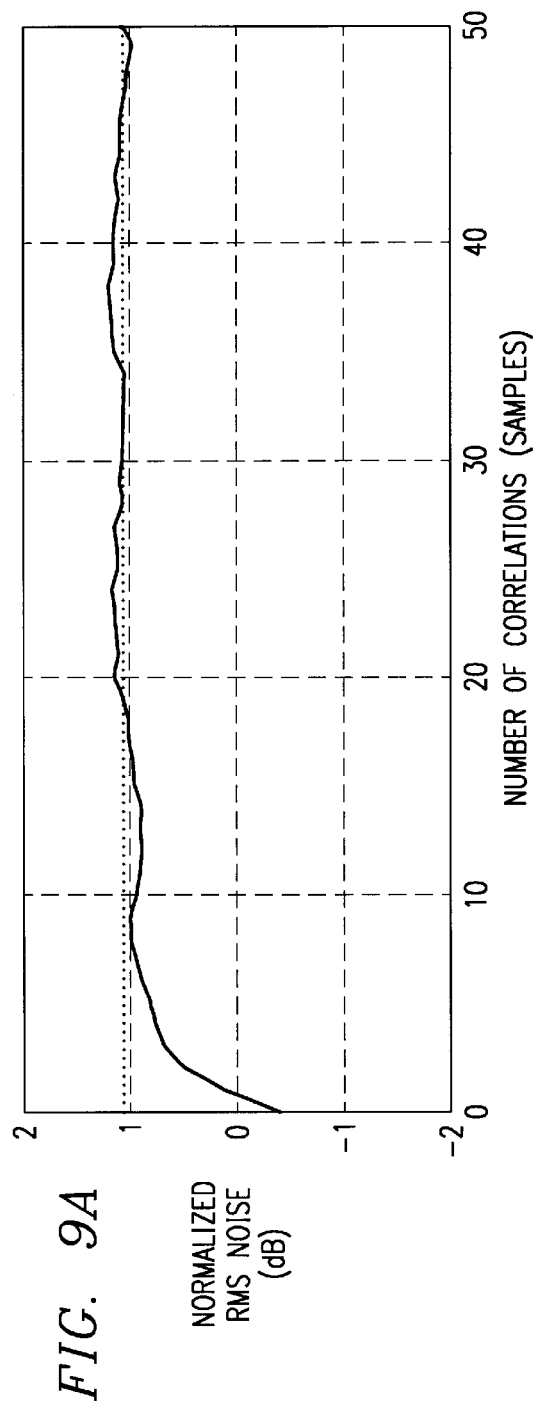
FIG. 9 (a) is a graph of normalized noise growth versus number of samples correlated for 50 correlations and FIG. 9 (b) is such a graph for 150 correlations.
Figure 9B:
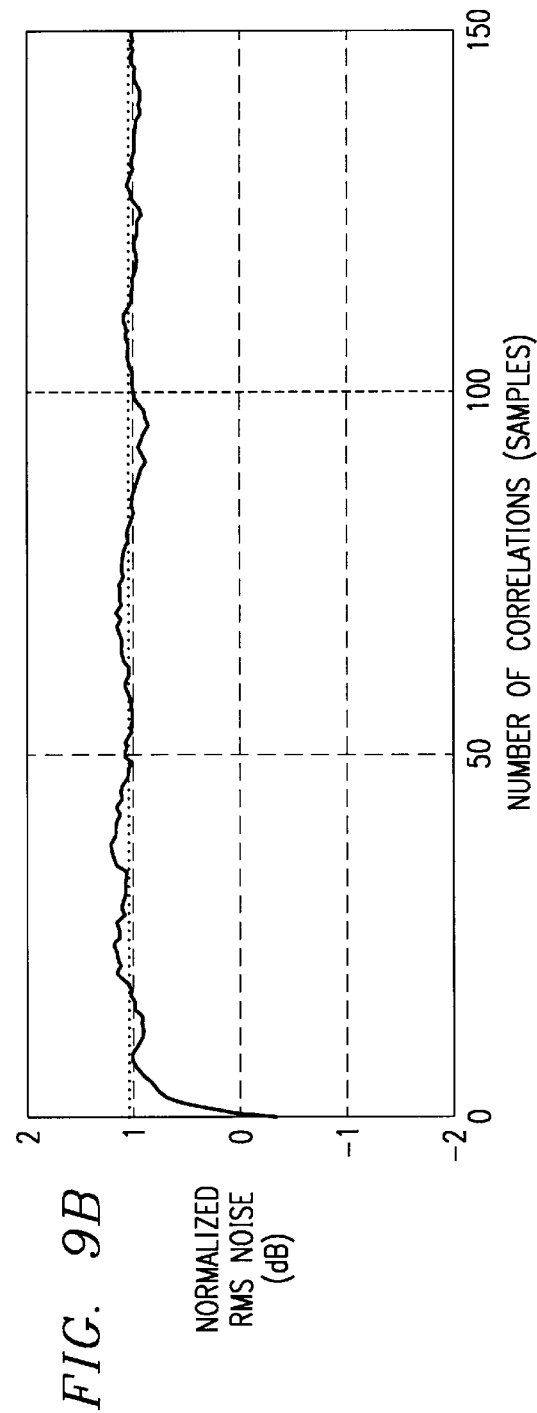

FIG. 9 shows the correlator response to complex white Gaussian noise. The data input to the correlator is stimulated with complex white Gaussian noise with a Root Mean Square (RMS) input level of 1.0. The correlator output is normalized by the square root of the number of correlations. This result is then converted to dB and graphed. The theoretical noise growth for a system without any non-linearities is at a rate of the square root of the number of additions. If such system were plotted in FIG. 5, it would show as 0 dB across both graphs.

From FIG. 9, it can be seen that, with the difference minimization non-linearity, the variation from the theoretical noise growth limit is only about 1 dB and this variance does not seem to be affected by the number of samples correlated. The effect of this is that the detection thresholds must be raised about 1 dB in order to compensate for this increase in noise growth.

FIGS. 10a and (b) show the rejection ratio of the correlator to signals with PRIs outside the selected correlation window. The correlator was stimulated with signals with PRIs varying from DC to 60 samples with white Gaussian noise added in at −36 dBc. The correlator was set up with n=20, which corresponds to signals with PRIs from 20 to 21 samples and the length of the data allowed for 32 PRI intervals to be correlated.

From FIG. 10a, it can be seen that the correlator response was down about 29 dB when the input signal was only of f by one PRI. The theoretical increase in signal for 32 correlated PRI intervals is 30 dB, therefore the rejection is within 1 dB of the theoretical limit.

One feature of this type of correlator is its response to subharmonics. In FIG. 10b it appears that there is no attenuation to the sub-harmonic signals (PRIs=programmed PRI/N). Also, from FIG. 10b, there appears to be about 25 dB of rejection to the super-harmonic signals (PRIs= Programmed PRI * N).

The response to sub-harmonics can be broken down into two types. The first type is the problem with DC signals. Any DC level at the input of the correlator will correlate up at every selected PRI at every temporal cell. This DC level might not even be caused by external signals but might be caused by a bias in the hardware. To compensate for this problem, the zero mean matched filter, which was discussed hereinabove, is required to remove any DC levels prior to the PRI correlator.

The second type is with sub-harmonics which are not DC. it was noted hereinabove how the zero mean matched filter can be tuned to a particular pulse width at the expense of pulse width smearing and a reduction in SNR. If there is a significant amount of pulse width smearing, it may be difficult to discern multiple pulses within a PRI frame. These factors are taken into consideration in setting up the filter coefficients.

In some instances, as with staggered PRIs, it may be beneficial to operate the PRI correlator in a sub-harmonic mode. In this mode, the final PRI frame can be inspected to determine the number of pulses and the stagger positions of the pulses.

The present correlator solves many problems with the detection of pulsed periodic signals in noisy environments. The SNR growth of the correlator is only 1 dB less than the theoretical limit for an ideal correlator. other advantages of the correlator include its ability to reject signals which are not matched to the selected correlator and the fact that it preserves pulse width information which could prove to be very important in signal identification.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A correlator system for performing real time temporal correlation, which comprises:
   (a) a source of pulsed and periodic input signal having DC components;
   (b) a zero mean pulse width filter responsive to said input signals that are pulsed and periodic for providing an output signal with said DC components from said input signals removed; and (c) a difference minimization Pulse Repetition Interval (PRI) correlator for performing temporal correlation on said output signals to correlate signals of a selected pulse repetition interval and reject signals not of said selected pulse repetition interval by minimizing the difference between a normalized delay output and either a current input or a time shifted input.

2. The system of claim 1 wherein said input signals include signal information and noise, said filter further providing gain to said signal information relative to said noise information.

3. A correlator system for performing real time temporal correlation, which comprises:

(a) an input terminal;

(b) a plurality of correlator circuits coupled to said input terminal, each of said correlator circuits including:

(i) a source of pulsed and periodic input signal having DC components;

(ii) a zero mean pulse width filter responsive to said input signals that are pulsed and periodic for providing an output signal with said DC components from said input signals removed; and (iii) a difference minimization Pulse Repetition Interval (PRI) correlator for performing temporal correlation on said output signals to correlate signals of a selected pulse repetition interval and reject signals not of said selected pulse repetition interval by minimizing the difference between a normalized delay output and either a current input or a time shifted input.

4. The system of claim 3 wherein said input signals include signal information and noise, said filter further providing gain to said signal information relative to said noise information.

5. The system of claim 3 further including means for selectively disabling at least one of said plurality of correlator circuits.

6. The system of claim 4 further including means for selectively disabling at least one of said plurality of correlator circuits.

7. The system of claim 5 wherein said disabled correlator circuits are simultaneously disabled.

8. The system of claim 6 wherein said disabled correlator circuits are simultaneously disabled.

9. The system of claim 5 wherein said disabled correlator circuits are sequentially disabled.

10. The system of claim 6 wherein said disabled correlator circuits are sequentially disabled.

11. The system of claim 3 wherein each of said plurality of correlator circuits is correlated to a different pulse repetition interval.

12. The system of claim 4 wherein each of said plurality of correlator circuits is correlated to a different pulse repetition interval.

13. The system of claim 6 wherein each of said plurality of correlator circuits is correlated to a different pulse repetition interval.

14. The system of claim 8 wherein each of said plurality of correlator circuits is correlated to a different pulse repetition interval.

15. The system of claim 10 wherein each of said plurality of correlator circuits is correlated to a different pulse repetition interval.

16. The system of claim 1 wherein said correlator includes a matched pulse repetition interval filter for filtering said output signals from said zero mean pulse width filter.

17. The system of claim 3 wherein said correlator includes a matched pulse repetition interval filter for filtering said output signals from said zero mean pulse width filter.

18. The system of claim 6 wherein said correlator includes a matched pulse repetition interval filter for filtering said output signals from said zero mean pulse width filter.

19. The system of claim 11 wherein said correlator includes a matched pulse repetition interval filter for filtering said output signals from said zero mean pulse width filter.

20. The system of claim 15 wherein said correlator includes a matched pulse repetition interval filter for filtering said output signals from said zero mean pulse width filter.

* * * * *

UNITED STATES PATENT AND TRADEMARK OFFICE
CERTIFICATE OF CORRECTION

PATENT NO. : 5,963,677
DATED : October 5, 1999
INVENTOR(S) : Michael C. Schrick

It is certified that error appears in the above-identified patent and that said Letters Patent is hereby corrected as shown below:

On the title page:

Item: [56] References Cited, after "3,710,384 1/1973 Ashcraft", insert -- 3,922,676 11/1975 O' Berry, et al.--.
After "5,265,121 11/1993 Stewart", insert --5,583,505 12/1996 Andersen, et al.--

Column 5; line 33, after "-8.5", delete "-6.8" and insert -- -8.8 --
Column 5; line 35, after "-4.0", delete "-4.0", and insert -- -4.3 --.

Column 7; line 35, after "33", delete "(Ib)", and insert--($I_b$)--.

Signed and Sealed this

Twenty-third Day of January, 2001

Attest:

Q. TODD DICKINSON

*Attesting Officer*    *Commissioner of Patents and Trademarks*